INVENTORS
Lester Steinbrecher
David Y. Dollman
Dwight E. Bucakowski
James W. Harrison
By Synnestvedt & Lechner
ATTORNEYS

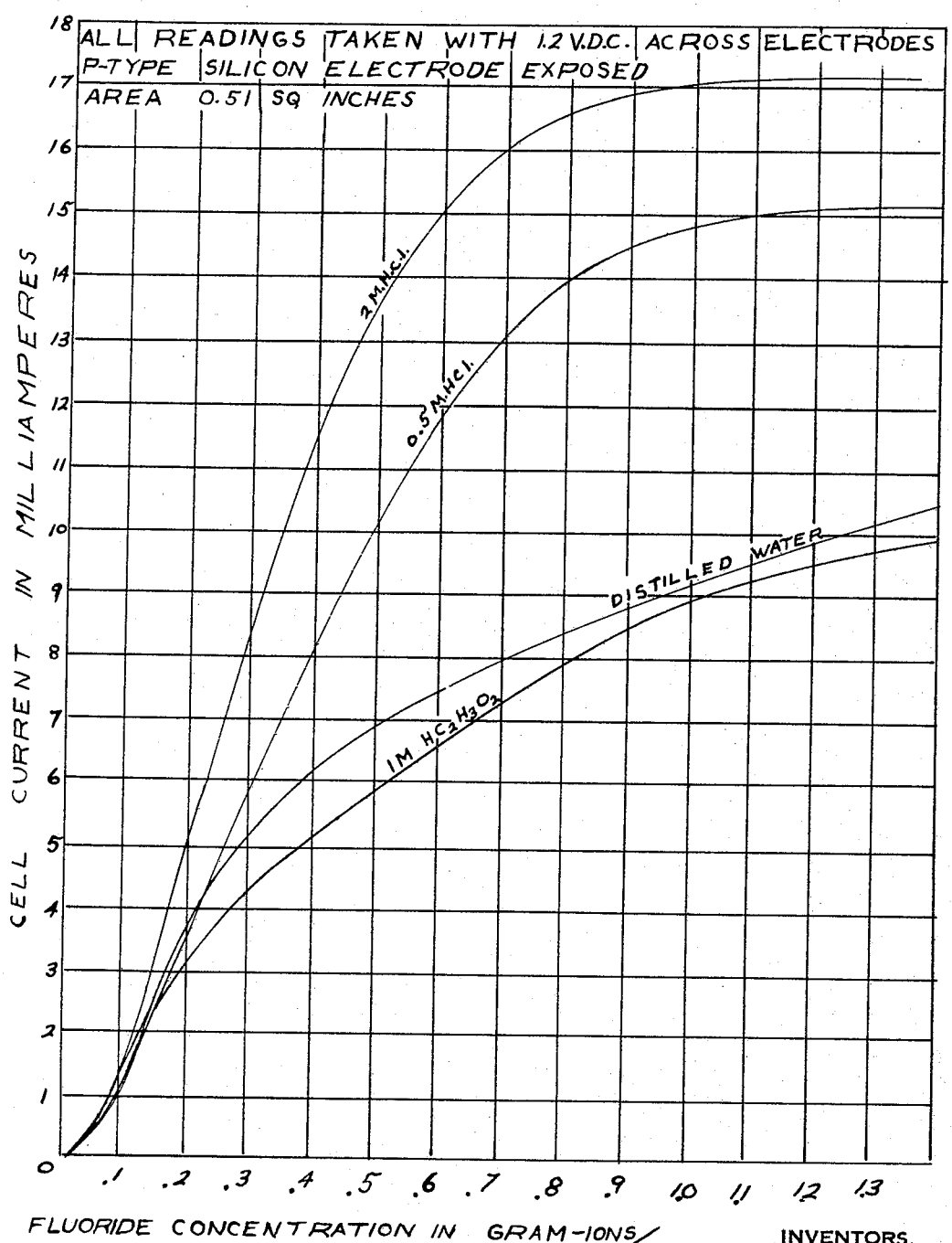

United States Patent Office 3,329,587
Patented July 4, 1967

3,329,587
METHOD AND APPARATUS FOR MEASURING
FLUORIDE ACTIVITY
Lester Steinbrecher, Philadelphia, David Y. Dollman, Lansdale, Dwight E. Buczkowski, Philadelphia, and James W. Harrison, Wyndmoor, Pa., assignors to Amchem Products, Inc., Ambler, Pa., a corporation of Delaware
Filed July 3, 1963, Ser. No. 292,670
2 Claims. (Cl. 204—1)

This invention relates to a method and apparatus for measuring fluoride activity in acidic aqueous solutions.

The terms "fluoride activity," "activity," and "active fluoride" are used herein to designate a property exhibited by fluoride when it is present in acidic aqueous solutions, or, stated another way, a property of the fluoride containing solution itself. For present purposes, the activity of the fluoride may be taken as its ability to cause a solution containing it to etch a piece of lime soda glass. Fluoride activity is an important property of many industrially important fluoride containing solutions. One class of such solutions which will be discussed briefly below are those used to form protective coatings on metals.

The actual form taken by the fluoride which enables it to exhibit fluoride activity as herein defined is not known. It is known, however, that fluoride activity is not a measure of the total amount of fluoride present in the solution in all forms. It is also known that certain complexes containing fluoride and certain unionized fluoride salts, such as aluminum fluoride, do not appear to contribute materially to the activity of an acidic solution. Furthermore, fluoride ion in neutral solutions does not appear to exhibit activity.

For these reasons, no attempt will be made here to construct a theoretical model of the mechanism by which fluoride activity is created. For the purposes of presenting the results obtained in the present invention in quantitative form, the viewpoint has been taken here that the activity is caused by fluoride ions. Thus the quantitative results will be expressed in terms of gram-ions of fluoride ion per liter. This form of expression is used merely for convenience and is not intended to express a position concerning the cause of fluoride activity, since this is in fact unknown.

The method and apparatus have their primary utility in measurements made on acidic systems, since these are the systems in which, according to present experience, fluoride activity is present.

The invention is useful in monitoring fluoride activity in various types of solutions in which wide variety of other anions are present. Heretofore reliable measurements of fluoride activity have been inherently difficult to obtain because many analytical methods are unable to differentiate between fluoride activity and the total fluoride content. Total fluoride concentration is a relatively less important property than activity, since it is the activity of the solution which determines its degree of utility for many purposes.

U.S. Patent 2,814,577 discloses one analytical scheme which does have the ability to segregate the fluoride activity from the total fluoride content in a solution. The method taught by this patent involves a measurement of the ability of the solution to etch ordinary glass. While it is extremely useful, the procedure is time consuming and somewhat tedious. In addition, equipment such as an analytical balance is necessary to quantitize the results obtained. The present invention provides equipment for readily and accurately measuring fluoride activity in a very simple manner.

One field in which fluoride containing solutions are used extensively is in the art of producing corrosion resistant and decorative coatings on metals. The following U.S. patents illustrate processes employing aqueous solutions of fluoride for treating a variety of metals including aluminum, iron, steel, etc.: 2,438,877; 2,472,864; 2,678,291; 2,814,577; 2,909,455; 2,936,254; 2,796,370; 2,851,385; 3,009,842; 2,114,151; 2,507,956. In the solutions of these processes the principal and essential ingredients are usually fluorides and hexavalent chromium. In certain of the processes additional material, such as phosphate, arsenates and complex cyanides are also present in the treating solutions.

In the operation of metal treating processes, it is quite important to maintain the concentrations of the coating producing ingredients at substantially constant values as successive metal products are treated, in order to obtain a uniform quality of coating from product to product. Because of the inherent difficulty of measurement of fluoride activity and hence difficulty in controlling that ion, it has not been easy to achieve the desired high degree of uniformity of product. The method and apparatus of this invention have proved quite useful in overcoming this problem and they will be discussed herein principally in the context of equipment especially tailored for use in the metal treating industry. However, it should be understood that the method and apparatus are of utility in a wide variety of other applications.

According to the invention fluoride activity is measured by placing the solution in an electrolytic cell having two electrodes, one of which is composed of p-type silicon. A voltage is placed across the electrode and the current passing through the solution is measured. It is preferred that the equipment be arranged so that the cell and the electrodes are kept in darkness during the measurement but the method and equipment operate well in light of ordinary intensity. It has been discovered that over a substantial range of fluoride activity, the current passing through the cell is a function which is directly relatable to the fluoride activity. This relationship has been found to hold even though other anions are present in the solution and even though the pH of the solution varies.

It is an object of this invention to provide a method and apparatus for rapid and reliable measurement of fluoride activity in acidic solutions.

It is an object of this invention to provide a method and apparatus for rapid and reliable measurement of fluoride activity in order to facilitate applying coatings to metals.

A further object of the invention is the provision of a method and apparatus for monitoring fluoride activity in solutions containing other ingredients, for example, solutions such as those used in the metal treating art.

The above objects and purposes together with others may be more readily understood by a consideration of the detailed description which follows, together with the accompanying drawings in which:

FIGURE 5 is a graph showing the relationship between fluoride activity and the measured cell current in solutions containing various other anions.

Figure 1:
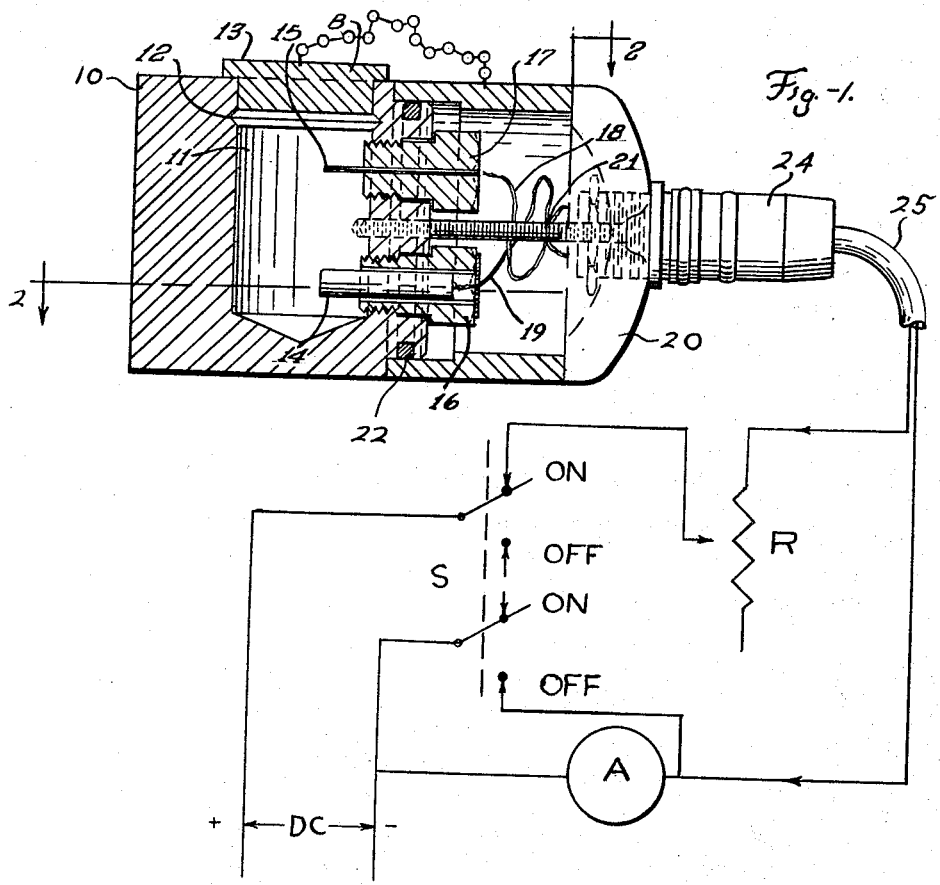
FIGURE 1 is a side elevational view of a measuring apparatus constructed according to the invention, the view being partly in section with the section being taken along the line 1—1 of FIGURE 2 and with a portion of the view showing diagrammatically the wiring associated with the measuring apparatus.
Figure 2:
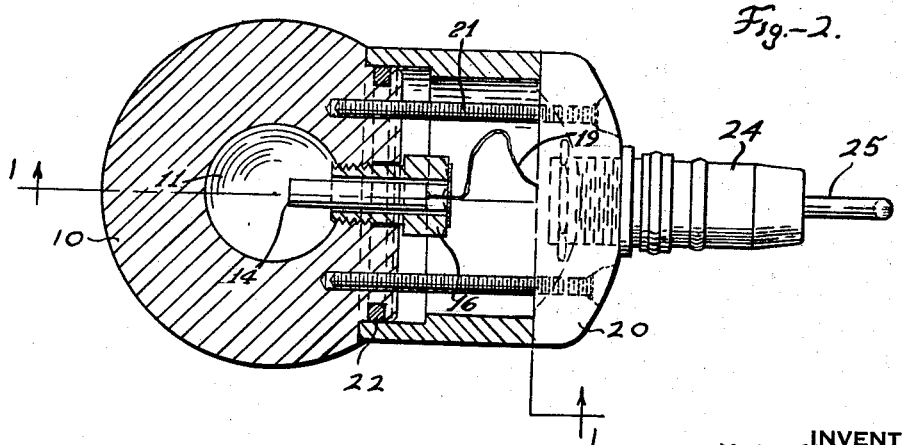
FIGURE 2 is a cross sectional plan view of the measuring apparatus shown in FIGURE 1, the section being taken on the line 2—2 of FIGURE 1.

Attention is first directed to FIGURES 1 and 2. As can be seen there is illustrated in those figures, a cell 10 having a sample holding compartment 11 therein. The cell may conveniently be constructed of opaque polyvinyl chloride plastic material, which is substantially insensitive to fluoride solutions. The compartment is generally cylindrical in shape, and near the top has a groove 12 which serves as a filling guide. In use the cell is filled with the sample upon which the measurements are to be made up to the groove 12. A cap 13 is provided which when in place completely darkens the sample compartment 11. Mounted in the side of the cell 10 are two electrodes, one of which is the p-type silicon electrode 14, and the other is an inert electrode 15, preferably made of platinum. The electrodes are mounted in plastic bolts 16 and 17. The use of an opaque construction material produces a cell from which light is readily excluded. If desired, however, a transparent or translucent material may be used for the cell, and a separate light shield employed to exclude light.

The p-type silicon electrode 14 is desirably cylindrical in shape. A piece of polyvinyl chloride tube can readily be heat shrunk onto the cylindrical electrode, leaving the desired area protruding beyond the end of the tubing. The tubing is cemented in a hole bored in the plastic bolt 16 which is threaded into the cell 10. The inert electrode 15 may conveniently be a platinum wire which is drawn through a fine hole in bolt 17. A lead wire 18 is attached to the platinum electrode, and a lead wire 19 is fastened to the silicon electrode. The plastic bolts are enclosed in a protective casing 20 which is attached to the cell by means of screws 21. An O-ring 22 is utilized to insure that a tight seal is obtained for further protection of the wiring. The lead wires 18 and 19 are passed through a connector 24 and a cable 25 leading to the external electrical circuit which is shown diagrammatically in FIGURE 1.

Turning now to the circuit, it can be seen that a source of direct current is applied with the positive side connected to the silicon electrode and the negative side connected to the inert electrode. An ammeter marked A in FIGURE 1 is placed in series with the cell. While it is shown on the negative side of the cell in the drawing, this is merely for convenience and the meter may in fact be positioned on either side. A switch S is employed to connect the power source to the cell. The variable resistor R is placed in the circuit so that the voltage placed across the cell may be adjusted by the operator.

The currents developed in the course of measurements of the fluoride solution will ordinarily be of the order of a few milliamperes, and the ammeter should have a suitable sensitivity in this current range.

The power supply should be adequate to provide about 2 volts and a standard mercury cell battery supplying about 1.35 volts, steady state, has been found to be quite satisfactory. If desired, such cells may be mounted in series to increase the available voltage and in parallel to increase the available current. In addition, for certain applications, standard dry cell batteries may be used.

The general operation of the invention with reference to FIGURE 1 is as follows. The solution to be measured is placed in the sample compartment 11 of the cell 10. Preferably the cap is then replaced, care being taken to insure that all light is excluded from the interior of the cell. A voltage is placed across the cell, and the current is measured by means of the ammeter A. When the circuit is closed, the ammeter will read a rather large current, which quickly falls so that a nearly steady state reading is obtained within about 2 to 6 minutes. The steady reading is the reading of interest, and when current values are referred to hereinafter it will be understood that reference is made to this steady reading. It should also be noted that the current values given are for unstirred solutions.

It has been found that the current reading on the ammeter is related to the degree of fluoride activity in the sample when expressed as fluoride ion concentration. With a given silicon electrode area, and a given applied voltage, the relationship between the current and the activity is approximately linear for dilute solutions. If the nature of the work requires greater precision than that expressed by this approximate relationship, or if the concentrations are great enough to make the relationship non-linear, accurate calibration curves can be developed to express the relationship for the particular measuring equipment and the particular type of system which is being measured.

The presence of other anions in the solution at small concentrations of fluoride activity has little effect on the relationship, but over wide ranges of activity, the current-activity relationship is altered somewhat, depending upon which anion or anions are present. The method and apparatus are nonetheless selective of fluoride activity, that is to say, they are substantially insensitive to moderate changes in the concentrations of the other anions. Once again, in the event measurements are being made on a system in which the effect of the other anions must be taken into account, precise calibration curves can be constructed for a particular system having in it other known anions.

With a p-type silicon electrode with a fixed area exposed to the sample, the slope of the curve defining the current-activity relationship varies with the applied voltage. For a given applied voltage, the slope of the curve defining the relationship varies with the area of the p-type silicon electrode which is exposed to the sample. It has also been noted that the slope of the curve may be modified by stirring the solution which is being measured. By adjusting these parameters it is possible to maximize the performance of a given cell to meet the particular analytical conditions encountered. The parameters of voltage and electrode area are particularly susceptible to adjustment, and in general it is preferred that stirring be avoided since it introduces fluctuations in the cell current.

As mentioned above, it is preferred that light be excluded from the sample during measurement. Light in ordinary quantities falling on the sample and the electrodes has only a slight effect on the cell current obtained. However, for precision work it is desirable to standardize and hold constant all factors which can readily be controlled. For this reason, the preferred arrangement of the equipment and method includes exclusion of light, or in other words standardization of the light at zero. On the other hand, for technical or routine measurements extremely high precision may not be required, and light of the type and quantity encountered under ordinary indoor conditions is tolerable.

The relative insensitivity to light of the present invention forms one special advantage offered over several known fluoride measuring methods utilizing silicon electrodes.

One such method is reported by D. R. Turner in "Saturation Currents at n-type Silicon and Germanium Electrodes in Chemical Etching Solutions" in the Journal of the Electrochemical Society, June 1961, pp. 561–563, and in a scientific communication entitled "A Simple and Rapid Method for Fluoride Ion Determination" in Analytical Chemistry, June 1961, pp. 959–960. This method utilizes an n-type silicon electrode and is viewed by Turner as measuring fluoride ion concentration. The method contemplates making the measurement on solutions of fluoride in concentrated nitric acid, while keeping the cell in darkness. Light introduces an undesirable variation in the cell current. This current is quite small.

Another known method is described in copending U.S. patent application Ser. No. 236,266, Method and Apparatus for Measuring Floride Activity, of Steinbrecher et al., assigned to the same assignee as this application. This method differs from Turner in that it is capable of measuring fluoride activity on a wide variety of dilute fluoride solutions, and in that the cell current produced is considerably greater. One step in this method not present in Turner is the use of light of fixed intensity and spectral distribution.

Light, to the extent that it affects the present invention, causes a slight decrease in the cell current. But the relative lack of sensitivity means that simplifications in procedure and equipment over both of the above teachings is attained. Beyond this the cell current produced in the present invention is several times greater than that produced by the method utilizing n-type silicon and fixed light, and much greater than that produced by n-type silicon in the dark in nitric acid solution. The increased current, and changes therein, are more conveniently and reliably measured, than the smaller currents of the known procedures.

Figure 3:
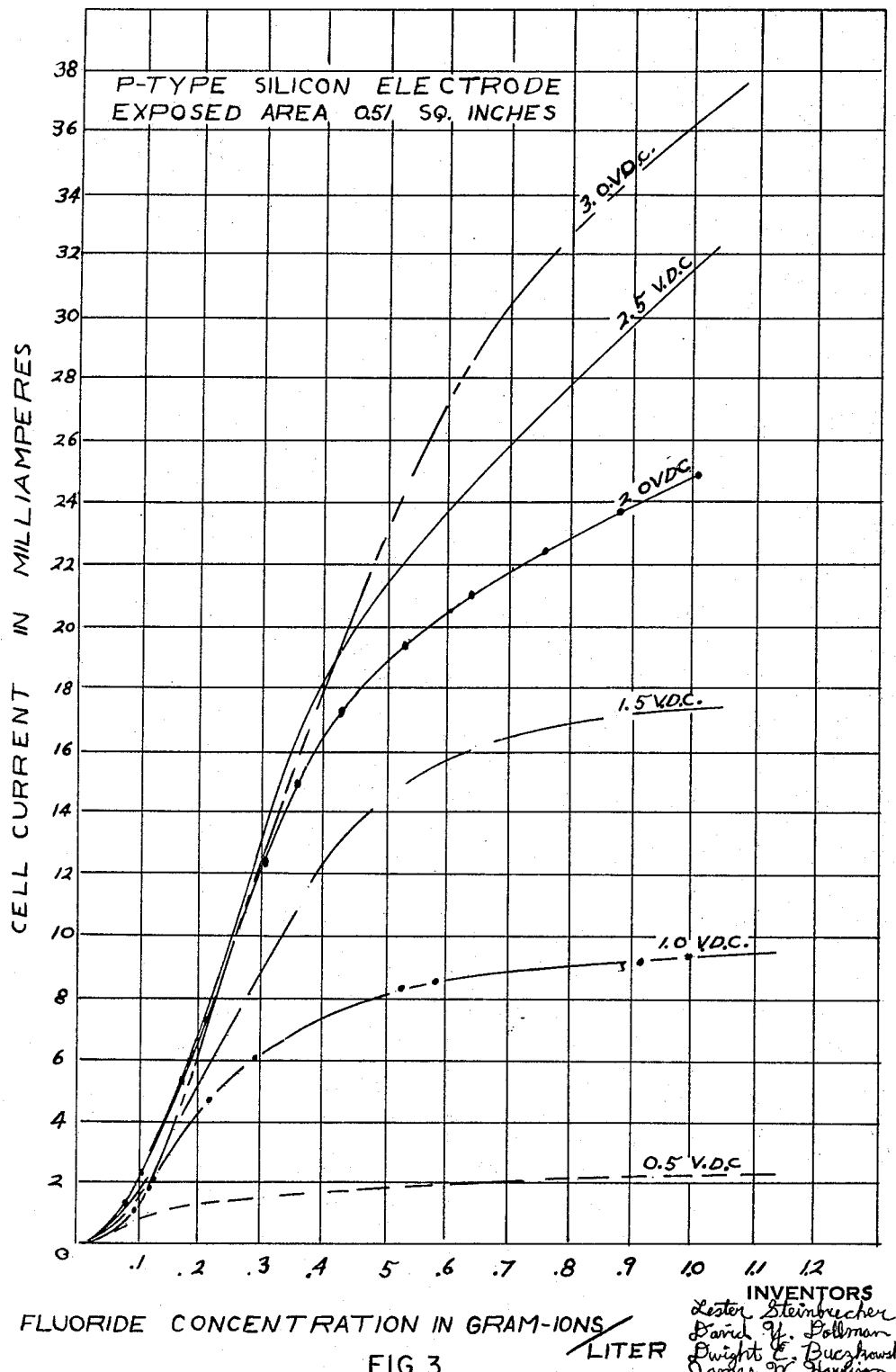
FIGURE 3 is a graph illustrating the effect of varying the voltage which is applied to the electrodes on measurements made according to the invention.
Figure 4:
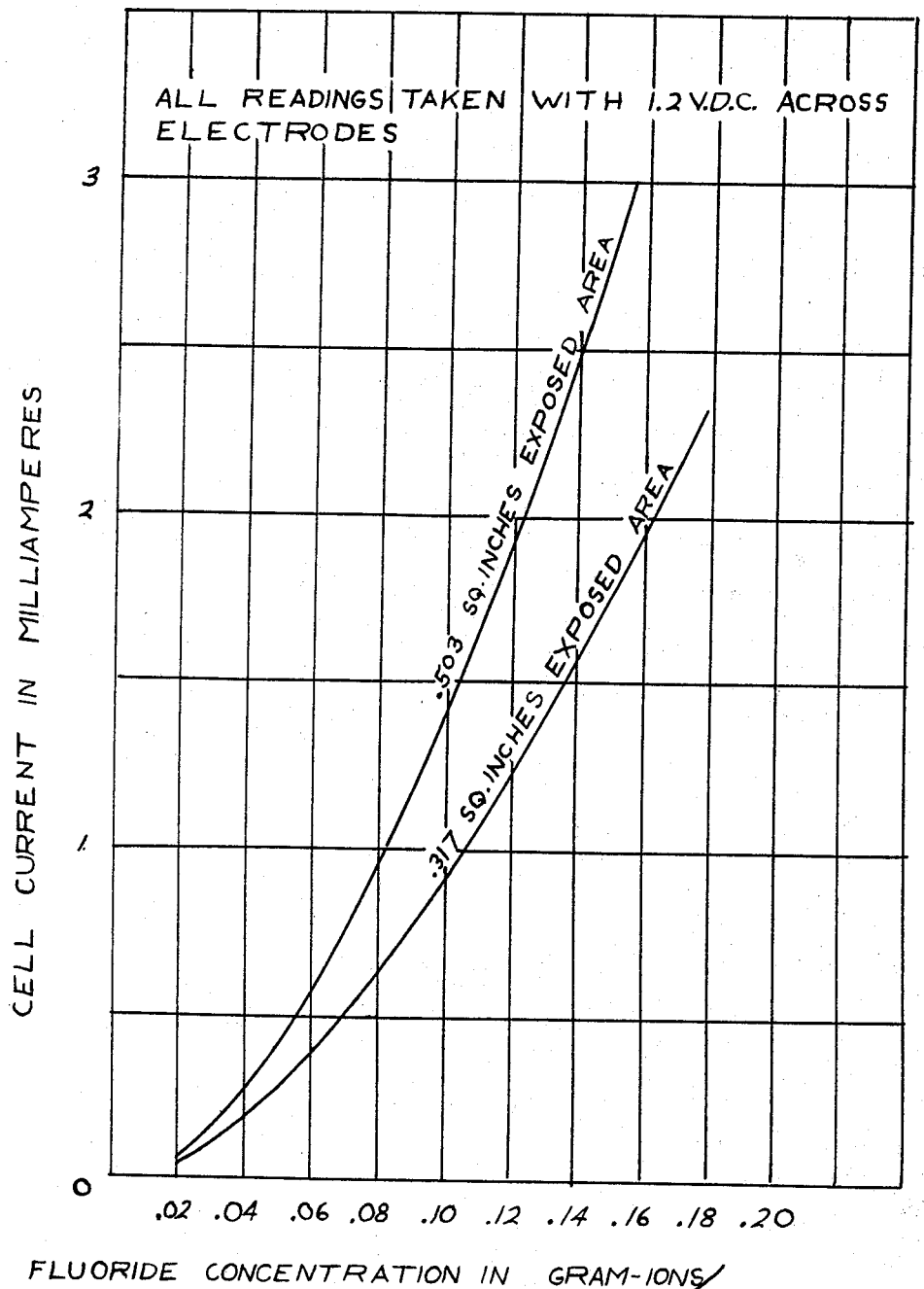
FIGURE 4 is a graph showing the effect of altering the area of the silicon electrode used in making measurements according to the invention.

In order to amplify an understanding of the above considerations, attention is now directed to FIGURES 3, 4 and 5. The data on these figures were gathered by means of an instrument such as that shown in FIGURES 1 and 2.

In gathering the data on FIGURES 3 and 4, a representative metal treating solution was employed as the base solution. The fluoride activity of the base solution was amplified during the development of the data by adding hydrofluoric acid to the base solution. The other components of the treating solution used consist of 14.1 grams per liter of chromic acid and 40 grams per liter of phosphoric acid. These concentrations were held constant, even though the fluoride activity was varied.

FIGURE 3 illustrates the way the relationship between cell current and fluoride activity changes as the applied voltage is changed when the silicon electrode area is held constant. As can be seen from the figure there results a family of curves with generally increasing slopes as the voltage is increased. It should be noted that the change resulting from a given increment in voltage decreases as the absolute level of voltage increases. Thus the 2.5 volt line and the 3.0 volt line substantially coincide over an appreciable range. Therefore there is a limit to the increase in sensitivity which can be obtained by increasing the applied voltage. For most measuring purposes, a voltage of about 1.2 volts D.C. has been found to be satisfactory, and generally speaking voltages between about 0.3 volt D.C. and about 3.5 volts D.C. may be used.

Lower voltages result in lower sensitivity. Higher voltages, while operative, accelerate the formation of a film on the electrodes. This effect is more noticeable at high fluoride concentrations than at low concentrations. This film interferes in varying degrees with the measurement. At the preferred voltage the film presents only a minor problem since it is easily removed by chemically etching the electrodes, and further, it does not form at an excessive rate. A suitable cleaning solution for the electrodes is 50 ml. of concentrated nitric acid plus 30 ml. of 49 percent hydrofluoric acid plus 30 ml. of glacial acetic acid.

It may also be pointed out here that for any given voltage there is a very slight drift at the outset of the measuring step, but that the current readings quickly assume a steady state value. Factors which are not completely understood cause this drift. There is no substantial problem either with the initial drift or with cell polarization which is sometimes encountered in electrochemical apparatus. A consideration of FIGURE 3 will also make it clear that once an operating voltage is selected, it is important to maintain the voltage substantially constant from measurement to measurement to eliminate the variations in the current-activity relationship resulting from voltage changes.

FIGURE 4 illustrates the effect on the cell current-fluoride activity relationship which is brought about by changes in the area of the p-type silicon electrode exposed to the sample. From this figure it can be seen that an increase in the exposed area of electrode, at a given voltage, results in an increase in the slope of the line defining the relationship, and hence in the sensitivity. At low concentrations of fluoride activity this forms a useful way to increase the sensitivity.

FIGURE 5 presents a series of curves developed by varying the fluoride activity in a series of solutions, to illustrate the effect of other anions on the relationship. It should first be noted that the various curves lie close together at dilute concentrations, and thus approximate the same generally straight lines. However, at higher fluoride activities, the curves diverge and as the activity is further increased, the curves flatten out so that sensitivity is for the most part lost in the higher activity regions.

A consideration of the curves for 2 molar hydrochloric acid and 0.5 molar hydrochloric acid concentration will show that in the dilute regions, for example up to about .1 gram-ion per liter of fluoride activity the curves are sufficiently close together to be regarded as a single curve. That is to say, in the dilute region the method and apparatus of the present invention are substantially insensitive to changes in the concentration of a given additional anion. In this regard, the curves for hydrochloric acid may be regarded as typical of curves for various concentrations of other anions.

When the concentration of the anion other than that causing the fluoride activity is known, calibration curves, such as those shown in FIGURE 5, can be developed for the range of concentration of interest.

By way of summary, certain preferences in the construction and operation of the apparatus and method may be pointed out. The silicon electrode must be of p-type, and is preferably a single crystal. The surfaces of this electrode which is presented to the solution may be of any convenient size but very satisfactory operation is obtained when about 0.5 square inch is used. The spacing between electrodes may be any convenient distance. The inert electrode may be of any material which does not appreciably react with the solutions being tested and platinum meets this requirement very well. The voltages placed across the cell may vary from about 0.3 volt D.C. to about 3.5 volts D.C. with the preferred potential being about 1.2 volts D.C. The method and equipment when so arranged will measure fluoride activity in the range from about 0 gram-ion per liter to about 1.5 gram-ions per liter. More concentrated solutions may easily be measured by diluting the sample with a known amount of water to lower the concentration to within the range of the equipment.

It can be seen that the method and apparatus of this invention provide the art with a versatile and reliable means for measuring the fluoride activity of aqueous acid solutions.

We claim:

1. Apparatus for measuring the level of fluoride activity in an acid solution, in the range of from about 0.0 gram-ions per liter to about 1.5 gram-ions per liter of active fluoride, expressed as fluoride ion, comprising an opaque cell adapted to contain a sample of said solution, a p-type silicon anode positioned in said cell, said anode having a constant exposed area, an inert cathode positioned in said cell, external voltage supply means for placing and maintaining a constant voltage of from about 0.3 volt to about 3.5 volts across said anode and cathode, and external current measuring means for measuring the current passing between said anode and cathode when said constant voltage is maintained across them.

2. A method for measuring the level of fluoride activity in acidic aqueous solution, in the range of from about 0.0 gram-ions/liter to about 1.5 gram-ions/liter of active fluoride, expressed as fluoride ion, comprising immersing a pair of electrodes, one of which comprises a p-type silicon electrode of constant preselected area and the other of which comprises an inert electrode in said solution in darkness, placing a D.C. voltage of from about 0.3 volt to about 3.5 volts from an external voltage source across said electrodes, with the positive side of said voltage at said silicon electrode, maintaining said voltage across the electrodes at a constant value within the specified range, thereby passing a current through the solution between said electrodes, passing said current between said electrodes until it assumes a steady-state magnitude which is a function of the level of fluoride activity, and measuring said steady-state current passing between said electrodes.

References Cited

UNITED STATES PATENTS 3,219,556  11/1965  Arthur et al. _____ 204—195

OTHER REFERENCES

Turner: "Analytical Chemistry," June 1961, volume 33, No. 7, pages 959 and 960.

Turner: "J. of Electrochemical Soc.," 1960, volume 107, pages 810–816.

Flynn: "J. of Electrochemical Soc.," 1958, volume 105, pages 715–718.

Uhlir: "Bell System Technical Jour.," 1956, volume 35, pages 333–347.

Brattain et al.: "Bell System Technical Jour.," 1955, volume 34, pages 129–131.

JOHN H. MACK, *Primary Examiner.*

T. TUNG, *Assistant Examiner.*